(12) United States Patent
Diab et al.

(10) Patent No.: US 8,145,814 B2
(45) Date of Patent: Mar. 27, 2012

(54) METHOD AND SYSTEM FOR A CONFIGURABLE CONNNECTOR FOR ETHERNET

(75) Inventors: Wael William Diab, San Francisco, CA (US); Kevin Brown, Long Beach, CA (US); Michael Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 37 days.

(21) Appl. No.: 12/853,945

(22) Filed: Aug. 10, 2010

(65) Prior Publication Data

US 2012/0015552 A1 Jan. 19, 2012

Related U.S. Application Data

(60) Provisional application No. 61/365,189, filed on Jul. 16, 2010.

(51) Int. Cl.
*G06F 13/12* (2006.01)
*G06F 13/00* (2006.01)

(52) U.S. Cl. .......................... 710/62; 710/300; 709/250

(58) Field of Classification Search .............. 710/62–64, 710/300–303; 709/250; 439/676
See application file for complete search history.

(56) References Cited

U.S. PATENT DOCUMENTS

| | | | |
|---|---|---|---|
| 5,892,926 A * | 4/1999 | Witkowski et al. | 710/100 |
| 6,794,577 B1 * | 9/2004 | Bhogal | 174/74 R |
| 6,934,788 B2 * | 8/2005 | Laity et al. | 710/303 |
| 7,185,045 B2 * | 2/2007 | Ellis et al. | 709/200 |
| 7,774,628 B2 * | 8/2010 | Hansalia | 713/320 |
| 2004/0188129 A1 * | 9/2004 | Bhogal | 174/74 R |
| 2006/0116023 A1 * | 6/2006 | Spitaels et al. | 439/532 |
| 2009/0142965 A1 * | 6/2009 | Spitaels et al. | 439/639 |
| 2010/0049893 A1 * | 2/2010 | Drako | 710/301 |
| 2011/0243151 A1 * | 10/2011 | Diab et al. | 370/463 |
| 2011/0258464 A1 * | 10/2011 | Gammel et al. | 713/300 |

* cited by examiner

*Primary Examiner* — Christopher B Shin
(74) *Attorney, Agent, or Firm* — Sterne, Kessler, Goldstein & Fox PLLC

(57) ABSTRACT

Aspects of a method and apparatus for a configurable connector for Ethernet are provided. In this regard, a configurable Ethernet connector residing in an Ethernet enabled communication device may couple the communication device to one or more twisted pairs and enable communication of Ethernet frames over the twisted pair(s). Conductors of each of the twisted pairs may make contact with adjacent pins of the configurable Ethernet connector. A size and shape of the configurable Ethernet connector may enable housing of more than 48 instances of the configurable Ethernet connector in a single standard size one rack unit face plate of a 19-inch rack. The configurable Ethernet connector may provide mechanical and electrical indications that enable a device coupled to the configurable Ethernet connector to determine configuration information of the configurable Ethernet connector. The information may indicate presence or absence of various components within and/or on the configurable Ethernet connector.

24 Claims, 9 Drawing Sheets

METHOD AND SYSTEM FOR A CONFIGURABLE CONNNECTOR FOR ETHERNET

INCORPORATION BY REFERENCE

This patent application makes reference to, claims priority to and claims benefit from U.S. Provisional Patent Application Ser. No. 61/365,189 filed on Jul. 16, 2010.

Each of the above identified applications is hereby incorporated herein by reference in its entirety.

This patent application makes reference to:
U.S. patent application Ser. No. 12/701,381 entitled "Method and System for a Connector with Integrated Shield Detection" filed on Feb. 5, 2010;
U.S. patent application Ser. No. 12/702,173 entitled "Method and Apparatus for an Ethernet Connector Comprising an Integrated PHY" filed on Feb. 8, 2010;
U.S. patent application Ser. No. 12/731,908 entitled "Method and System for Ethernet Converter and/or Adapter That Enables Conversion between a Plurality of Different Ethernet Interfaces" filed on Mar. 25, 2010;
U.S. patent application Ser. No. 12/731,933 entitled "Method and System for Determining Characteristics of an Attached Ethernet Connector and/or Cable" filed on Mar. 25, 2010;
U.S. patent application Ser. No. 12/752,065 entitled "Method and System for a Connector with Integrated Power over Ethernet Functionality" filed on Mar. 31, 2010;
U.S. patent application Ser. No. 12/785,102 entitled "Method and System for Connector and/or Cable with Configurable Antenna for Ethernet and Wireless Applications" filed on May 21, 2010;
U.S. patent application Ser. No. 12/813,296 entitled "Method and System for Patch Panel Port Identification and Verification" filed on Jun. 10, 2010;
U.S. patent application Ser. No. 12/828,484 entitled "Method and System for a Connection System Operable to Sink and Source Supply Power" filed on Jul. 1, 2010;
U.S. Patent Application No. 61/365,211 entitled "Method and System for Modularized Configurable Connector System for Ethernet Applications" filed on Jul. 16, 2010;

Each of the above stated applications is hereby incorporated herein by reference in its entirety.

FIELD OF THE INVENTION

Certain embodiments of the invention relate to networking. More specifically, certain embodiments of the invention relate to a method and system for a configurable connector for Ethernet.

BACKGROUND OF THE INVENTION

Communication devices may incorporate a plurality of features, for example, a mobile phone, a digital camera, an Internet browser, a gaming device, a Bluetooth headphone interface and/or a location device. In this regard, the communication devices may be operable to communicate via a plurality of wire-line and/or wireless networks such as local area networks, wide area networks, wireless local area networks, cellular networks and wireless personal area networks, for example. In this regard, endpoint devices may communicate via various wireless and/or wire-line switches, routers, hubs, access points and/or base stations.

Many communication devices may communicate via twisted pair cables which may comprise pairs of copper wire that are twisted together. Various numbers of twists or turns in the wire pairs may enable mitigation of common mode electromagnetic interference. Twisted pair cabling may be shielded and/or unshielded. Shielding may comprise a conductive material that may enable grounding of the cable. The shielding may enclose a single pair of twisted wires and/or may enclose a plurality of pairs. The shielding may comprise foil and/or a braided sheath, for example. In this regard, the shielding may mitigate cross talk between twisted pairs and/or between a plurality of cables. Various properties of a cable, for example, wire gauge, safety information, category, verification of testing, inner shielding, outer shielding, no shielding, type of use, such as patch cord, and/or country of manufacture may be imprinted on the cable jacket during manufacture.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a configurable connector for Ethernet, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a configurable connector for Ethernet applications. In various embodiments of the invention, a configurable Ethernet connector residing in an Ethernet enabled communication device may couple the communication device to one or more twisted pairs and enable communication of Ethernet frames over the one or more twisted pairs. Conductors of each of the twisted pairs may make contact with adjacent pins of the configurable Ethernet connector. A size and shape of the configurable Ethernet connector may enable housing of more than 48 instances of the configurable Ethernet connector in a single standard size one rack unit face plate of a 19-inch rack. The configurable Ethernet connector may provide mechanical and electrical indications that enable a device coupled to the configurable Ethernet connector to determine configuration information of the configurable Ethernet connector. The information may indicate presence or absence of various components within and/or on the configurable Ethernet connector. The components may comprise a memory device which stores a configuration and/or capabilities of the configurable Ethernet connector. The components may comprise an Ethernet physical layer transceiver (PHY). The components may comprise one or more circuits and/or processors that are operable to manage supply power that may be sourced and/or sinked via the connector. The components may comprise a solid-state switch that is configurable via one or more control signals, and a configuration of the solid-state switch determines which pins of the Ethernet connector are coupled to which port(s) of an Ethernet PHY. The one or more control signals are generated by the Ethernet PHY.

The configuration information may indicate whether the Ethernet device sources or sinks power. The configuration information may indicate which ones of the twisted pairs are to be utilized for communicating the Ethernet frames. The configuration information may indicate which ones of the twisted pairs are to be utilized for delivery of supply power. The configurable Ethernet connector may comprise one or more first interfaces that enable electrically coupling the connector to a cable assembly, one or more second interfaces that enable electrically coupling the configurable Ethernet connector to a device that the configurable Ethernet connector is mounted within or on, and one or more third interfaces that enable electrically coupling the configurable Ethernet connector to a corresponding one or more other connectors that are mounted on or within the device. The configurable Ethernet connector may support one or more of 10BASE-T, 100BASE-T, 1GBASE-T, 10GBASE-T, 40GBASE-T, and 100GBASE-T.

Figure 1A:
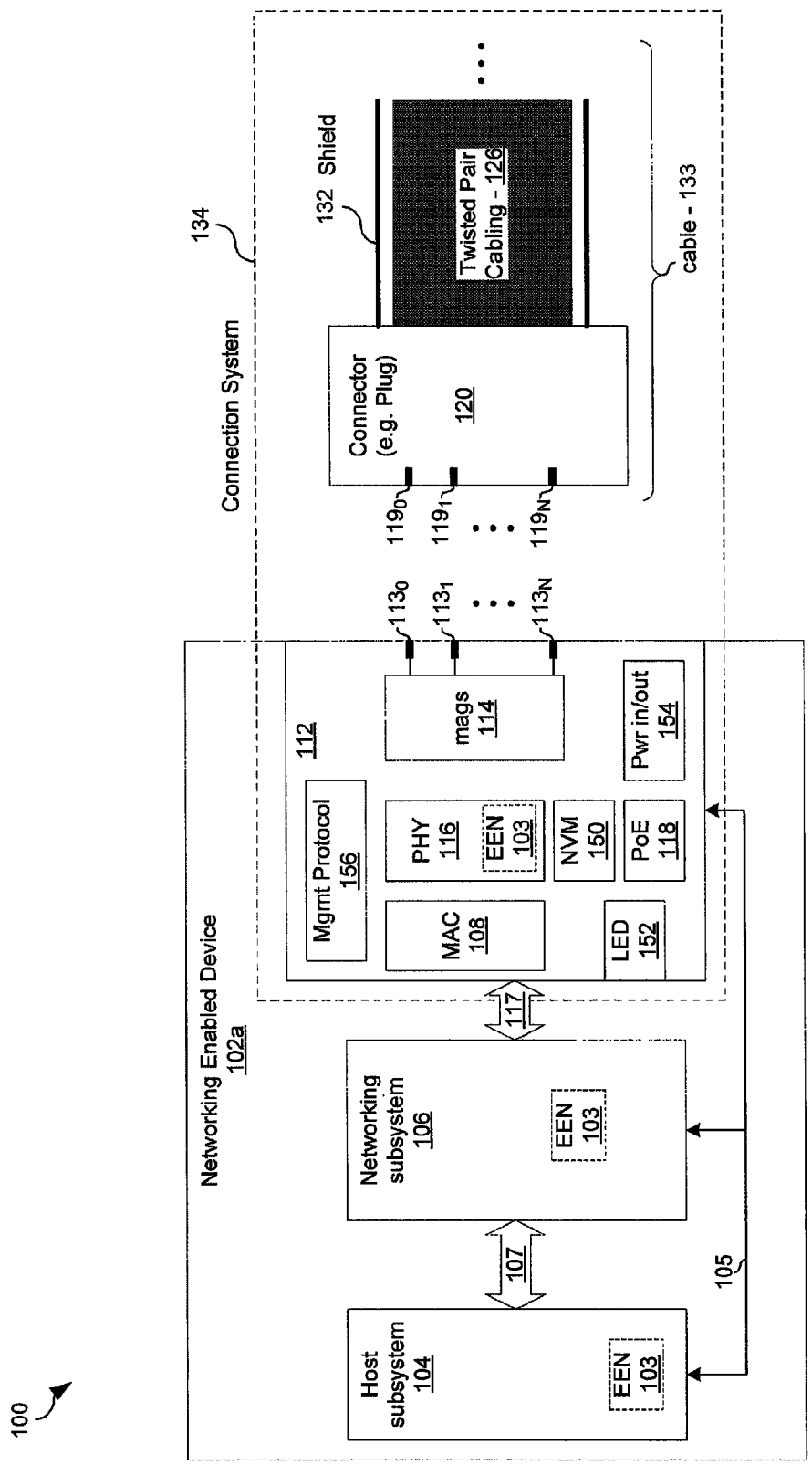
FIG. 1A is a block diagram illustrating an exemplary Ethernet enabled communication device comprising a configurable Ethernet connector wherein various components may be present or absent based on an implementation and/or use of the connector, in accordance with an embodiment of the invention.

FIG. 1A is a block diagram illustrating an exemplary Ethernet enabled communication device comprising a configurable Ethernet connector wherein various components may be present or absent based on an implementation and/or use of the connector, in accordance with an embodiment of the invention. Referring to FIG. 1A, there is shown a networking enabled device 102a and a connection system 134. The networking enabled device 102a may comprise a host subsystem 104, a networking subsystem 106, and a configurable Ethernet connector 112.

The networking enabled device 102a may comprise suitable logic, circuitry, interfaces and/or code that may be operable to perform computing and/or networking functions. An exemplary networking enabled device 102a may comprise a router, a switch, a patch panel, a laptop, a portable phone, a media player, a location device, a television, a set-top-box, a camera and/or a gaming device. The networking enabled device 102a may be operable to communicate via the connection system 134 based on a plurality of different standardized and/or non-standardized communication protocols and/or communication technologies, for example, based on various Ethernet protocols.

The host subsystem 104 may comprise suitable logic, circuitry, interfaces, and/or code that may be operable to perform computations and/or executing instructions in the networking enabled device 102a. For example the host subsystem 104 may comprise one or more state machines and/or may run an operating system. The host subsystem 104 may perform computations and/or execute instructions to generate messages for transmission via the networking subsystem 106. The host subsystems 104 may perform computations and/or execute instructions to process messages received via the networking subsystem 106. The host subsystem 104 may interface with the networking subsystem 106 via a data bus 107 which may be, for example, a PCI-X bus. In some embodiments of the invention, the host subsystem 104 may interface with various components in the connector 112 via one or more signals 105. The signals 105 may, for example, comprise one or more discrete control signals and/or one or more of the signals 105 may be communicated via a data bus such as an I²C bus or SMBus.

The networking subsystem 106 may comprise suitable logic, circuitry, interfaces, and/or code that may be operable to handle functionality of OSI layer 1 and higher OSI layers in the networking enabled device 102a, respectively. The networking subsystem 106 may be operable to implement switching, routing, and/or network interface card (NIC) functions. The networking subsystem 106 may be operable to implement Ethernet protocols, such as those based on the IEEE 802.3 standard, for example, but is not limited in this regard. The networking subsystem 106 may comprise, for example, a media access control (MAC) controller 108. However, in some instances the MAC 108, or portions thereof, may be integrated into the connector 112. The networking subsystem 106 may comprise, for example, an Ethernet physical layer device (PHY) 116. However, in some instances the Ethernet PHY 116 may be integrated into the connector 112.

The connection system 134 may comprise the configurable Ethernet connector 112, a cable 133, and another connector or termination (not shown) on a link partner. The cable 133 may comprise the connector 120, one or more twisted pairs 126, and one or more connectors or other terminations (not shown) on the opposite end. The twisted pairs 126 may comprise, for example, insulated twisted pairs of aluminum or copper. Characteristics of the cable 133, such as number of twisted pairs 126 within the cable 133, presence of shielding 132, length of the cable 133, and/or wire gauge used for the twisted pairs 126 may determine which protocols and/or which data rates the cable 133 may be operable to support. The optional shield 132 may comprise, for example, foil and/or a braided sheath around and/or along a length of one or more twisted pairs. For example, one or more individual twisted pairs 126 may be shielded via one or more corresponding shields 132, and/or a plurality of twisted pairs 126 may be encased in a single shield 132. The optional shield 132 may be grounded by the networking enabled device 102a via the connector 112, for example.

The connectors 112 and 120 may enable coupling the device 102a to the cable 133. In various embodiments of the invention, the connector 112 and the connector 120 may be suited for Ethernet communications and the connectors 112 and 120 may be small enough to fit into a handheld device and/or small enough such that more than 48 of the connectors 112 and/or 120 may fit into a standard size one rack unit face plate of a 19-rack rack. Upon mating of the connector 120 to the connector 112, the pins $119_0$-$119_N$ may be in conductive contact with the pins $113_0$-$113_N$, respectively. The term "connector" is used generically herein to encompass both receptacles and plugs. In this regard, whether a connector is a receptacle that accepts a plug or whether a connector is a plug that inserts into a receptacle may be implementation dependant and unimportant in various embodiments of the invention.

In various embodiments of the invention, the connection system 134 may comprise various characteristics. Such characteristics may include the length of the cable 133, the gauge of the wires of the twisted pairs 126, the presence or absence of the shielding 132, and the type of shielding 132. A system designer may select a particular characteristics, that is, select a particular configuration of the connection platform 134, based on, for example, the amount and/or type of data the device 102*a* the device is expected to handle, the environment in which the connection platform resides, whether energy efficiency is a priority for the device 102*a*, and/or a desired cost and/or performance of the system 100. In order to ensure compatibility between various portions of the connection platform 134, the connector 112 and/or the connector 120 may be keyed or comprise some other mechanical means for ensuring that only connectors 112 and 120 having compatible configurations may be mated.

Characteristics of the connection platform may also include a configuration of the connector 112 and/or the connector 120. The connectors 112 and 120 may be configurable in a variety of ways.

One exemplary way in which the connectors 112 and/or 120 may be configurable is that the number and placement of the pins 113 may be variable. For example, in some configurations, the connector 112 and/or the connector 120 may comprise more pins for interfacing to more twisted pairs and in some configurations it may have fewer pins for interfacing with fewer twisted pairs. The type of pins may refer to, for example, the material the pins are made of, e.g., gold, copper, aluminum, or tin. Additionally or alternatively, the type of pins may refer to the function of the pins. For example, in some instances the connector 112 and/or the connector 120 may comprise sense pins or other pins that indicate a configuration of the connector 112 and/or the connector 120.

Another exemplary way in which the connectors 112 and/or 120 may be configurable is that various electronic components may be present or absent within and/or the connectors 112 and/or 120. That is, various configurations of the connector 112 and/or 120 may have various electronic components installed, e.g., by soldering them to a PCB, or not installed. For example, the connectors 112 and/or 120 may each comprise a printed circuit board (PCB) having solder lands that accept various components, and different configurations of the connector 112 and/or the connector 120 may have different components populated and unpopulated and/or may have different versions of components populated. For example, different versions of components may comprise different models of the components having different capabilities or features. Exemplary components which may or may not be populated within and/or on the connector 112 and/or 120 may comprise, for example, a media access controller (MAC) or MAC functions 108, a physical layer transceiver (PHY) 116, a non-volatile memory (NVM) 150, a power over Ethernet (PoE) module 118, a module 154 that configures whether power is sourced or sunk by the device 102*a*, magnetics 114, one or more light emitting diodes (LEDs) 152, and a module 158 which may be operable to participate in network management protocols.

The MAC 108 may comprise suitable logic, circuitry, interfaces, and/or code that may be operable to perform data encapsulation and/or media access management, where media access management may comprise operations that handle conflicts arising from multiple networking enabled devices sharing the cable 133 and/or from multiple applications, processes, or virtual machines within the networking enabled device 102*a* sharing the connection system 134. In this regard, each MAC 108 may provide an interface between the PHY 116 and the host subsystem 104. Each MAC 108 may communicate with the PHY 116 via a media independent interface (xxMII). In this regard, "media independent interface (xxMII)" is utilized generically herein and may refer to a variety of interfaces including, but not limited to, a media independent interface (MII), a gigabit MII (GMII), a reduced MII (RMII), reduced gigabit MII (RGMII), and 10 gigabit MII (XGMII). The xxMII may comprise a carrier sense signal (CRS) which may be utilized to manage a rate at which data is communicated between the PHY 116 and the MAC 108. In various embodiments of the invention, integrating the MAC 108, or portions thereof operable to implement MAC functions, into the connector 112 may enable the connector 112 may handle media access. In this manner, multiple connectors 112 with integrated MAC functions may replace a single legacy connector. For example, multiple connectors 112 may fit into the solder land pattern and area of the device 102*a* previously occupied by a legacy connector. In this way, the number of ports on the networking device 102*a* may be increased by replacing the single legacy connector with a plurality of connectors 112.

The PHY 116 may comprise, for example, a twisted pair Ethernet PHY capable of operating at a variable data rate. In this regard, each PHY 116 may be operable to adjust a data rate at which it communicates based on characteristics of the connection system 134 via which it communicates. The PHY 116 may, for example, enable multi-rate Ethernet communications. For example, the PHY 116 may be operable to communicate at any of 10 Mbps, 100 Mbps, 1Gbps, 2.5Gbps, 4Gbps, 8 Gbps, 10Gbps, 40Gbps and 100Gbps. In this regard, the networking subsystem 106 may support standard-based data rates and/or non-standard data rates. The PHY 116 may be operable to achieve various data rates and/or implement various Ethernet protocols via configuration of various parameters. Exemplary parameters that may be configured in the PHY 116 to control the data rate may comprise the number of twisted pairs 126 over which the PHY 116 communicates, which one(s) of the twisted pairs over which the PHY 116 communicates, the symbol rate at which the PHY 116 operates, the encoding or modulation scheme utilized by the PHY 116, the inter-frame gap time, various buffer sizes, and/or various thresholds. In an exemplary embodiment of the invention, the PHY 116 may be configured based on the traffic that it handles. For example, if traffic is heavier in one direction than in the other direction, the PHY 116 may be configured to operate in an asymmetrical mode where outbound data and inbound data may be communicated at different rates. Similarly, the rate at which the PHY 116 communicates and the number of channels over which the PHY 116 communicates may be determined based on characteristics of the connection system 134. For example, the PHY 116 may be operable to communicate at higher rates and/or via more channels when coupled to shorter and/or larger diameter cabling, and communicate at lower rates and/or via fewer channels when coupled to longer and/or smaller diameter cabling. Additional details regarding a connector comprising an integrated PHY are described in co-pending U.S. patent application Ser. No. 12/702,173 referenced above.

The NVM 150 may comprise, for example, a programmable ROM which may store information about the connector 112. In this regard, the host subsystem 104 and/or the networking subsystem 106 may be operable to read the contents of the NVM 150 to determine characteristics of the connector 112. For example, the contents of the NVM 150 may indicate whether various components are present in the connector 112 and/or a configuration of components present in the connector 112. Additional details regarding a connector comprising an integrated NVM are described in co-pending U.S. patent application Ser. No. 12/731,933 referenced above.

The PoE module 118 may comprise suitable logic, circuitry, interfaces, and/or code operable to condition, regulate, and/or otherwise manage or control supply power available and/or drawn via the connection system 134. Additional details of a connector comprising an integrated PoE module are described in co-pending U.S. patent application Ser. No. 12/752,065 referenced above.

The module 154 may comprise suitable logic, circuitry, interfaces, and/or code operable to configure the connector 112 based on whether the device 102*a* sources and/or sinks supply power via the connector 112. Additional details of a connector comprising an integrated module such as the module 154 are described in co-pending U.S. patent application Ser. No. 12/828,484 referenced above.

The magnetics 114 may comprise suitable logic, circuitry, interfaces, and/or code that may be operable to couple the signal bus 117 to pins 113 of the connector 112. In this regard, the magnetics 114 may provide noise and/or EMI suppression and/or may impedance match the signal bus 117 to the connector 120 and the twisted pairs 126. In this regard, the magnetics 114 may comprise one or more transformers and/or one or more inductive chokes. In some instances, the magnetics 114 may also comprise other components such as resistors, capacitors, and/or inductors for achieving impedance matching, isolation, and/or noise and/or EMI suppression. In various embodiments of the invention, whether the magnetics 114, or portions thereof, are populated in the connector 112 may depend on, for example, the noise that the networking device 102*a* is expected to tolerate, the length of the cable 133 over which the networking device 102*a* will be expected to communicate, and/or whether the networking subsystem 102*a* will be tied to a fixed potential, e.g., "grounded," or whether it will be "floating." In this manner, by populating or not populating the magnetics 114, or portions thereof, different variants of the connector 112 may be manufactured for different use cases. Additional details of a connector comprising integrated magnetics are described in one or more of the co-pending United States Patent Applications referenced above.

The LED(s) 150 may be operable to indicate characteristics and/or status of the connection system 134. For example, the LED(s) 150 may indicate whether the connector 112 and 120 are properly mated, whether the shield 134 is present, whether data is being communicated over the cable 133, a length of the cable 133, whether the opposite end of the cable 133 is mated with a networking enabled device, whether various components are present in the connector 112 and/or 120, and/or a configuration of one or more components present in the connector 112 and/or 120. Additional details of a connector comprising one or more integrated LEDs are described in one or more of the co-pending United States Patent Applications referenced above.

The module 158 may comprise suitable logic, circuitry, interfaces, and/or code operable to implement one or more network management protocols such as simple network management protocol (SNMP), link layer discovery protocol (LLDP), and data center bridging exchange (DCBX) may be integrated on and/or within the connector 112 and/or the connector 120. In this regard, packets in accordance with one or more network management protocols may be generated and/or parsed or deconstructed in the connector 112 and/or the connector 120. That is, one or more network management protocols may be terminated in the connector 112 and/or the connector 120. In this manner, various components of the connector 112 and/or other portions of the networking enabled device 102*a* may be configured and/or otherwise managed based on management information received over a network. Similarly, information recovered from one or more LLDP packet may be conveyed to the host subsystem 104 and/or the networking subsystem 106.

In operation, the networking enabled device 102*a* may be operable to determine characteristics of the connection system 134. Such a determination may result from an electrical and/or mechanical indication provided by the connector 112 and/or 120.

Figure 1B:
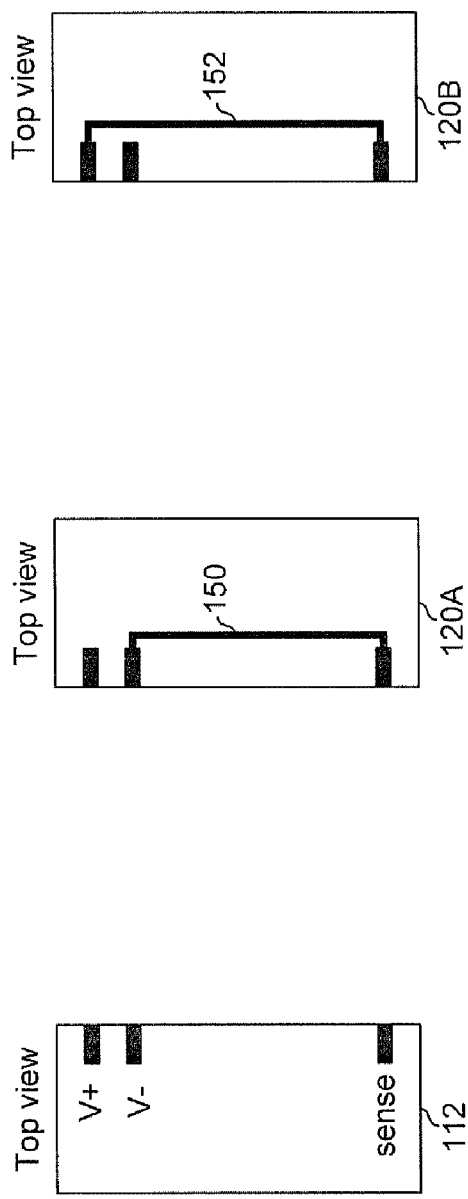
FIG. 1B is a block diagram illustrating connectors which comprise electrical characteristics to indicate whether power is to be sourced or sinked, in accordance with an embodiment of the invention.
Figure 1C:
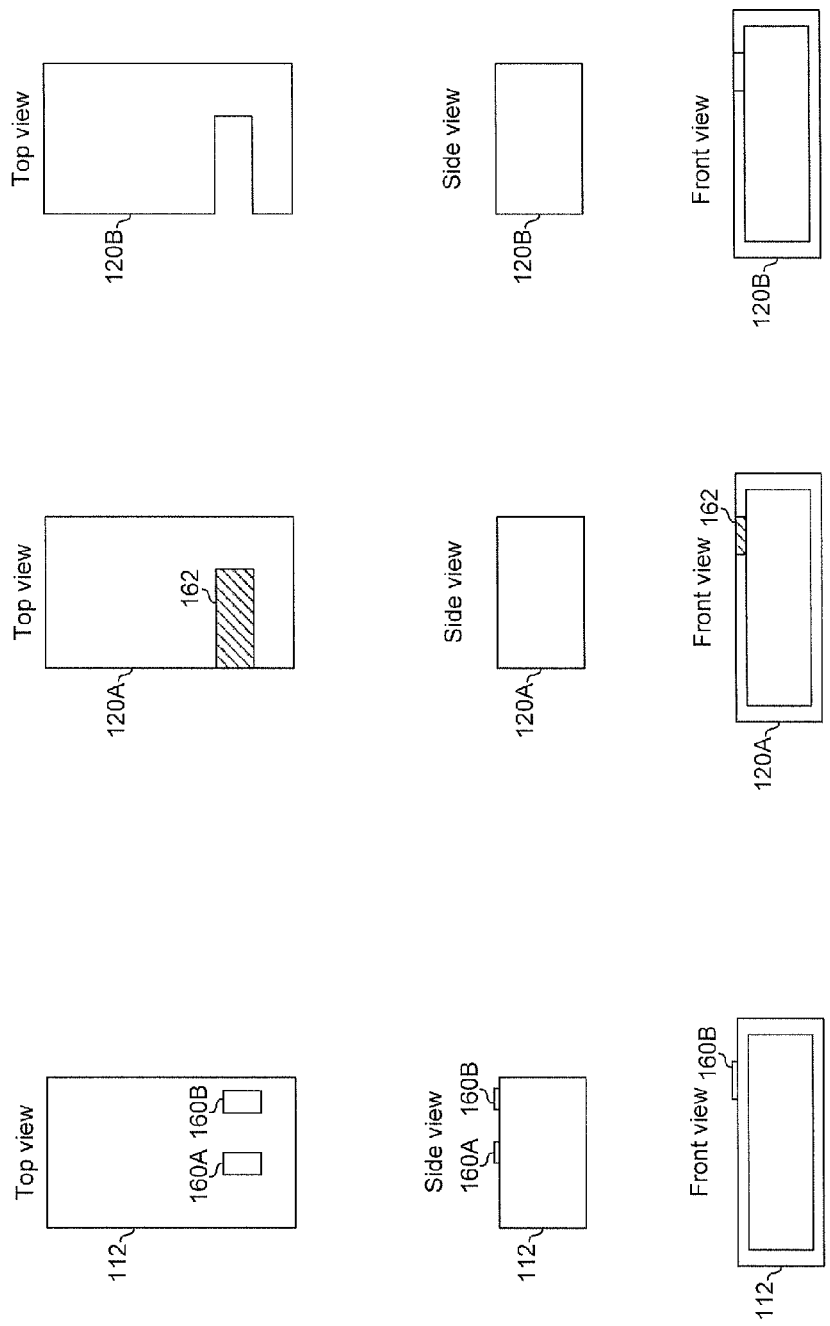
FIG. 1C is a block diagram illustrating connectors which comprise electro-mechanical characteristics to indicate whether power is to be sourced or sinked, in accordance with an embodiment of the invention.

In various embodiments of the invention, the presence of one or more pins, a voltage on one or more pins, and/or mechanical characteristics of the connector 120 that is mated with the connector 110. The type of pins may refer to the function of the pins. For example, in some instances the connector 112 and/or the connector 120 may comprise sense pins or other pins that indicate a configuration of the connector 112 and/or the connector 120. Also, a first set of electrical and/or mechanical features on a connector 120 may indicate a first configuration and a second set of electrical or mechanical features on a connector 120 may indicate a second configuration. In this regard, FIG. 1B illustrates a an exemplary embodiment of the invention in which connector 120A comprises a conductor 150 which ties the sense pin to V+ to indicate a first configuration, and a connector 120B comprises a conductor 152 which ties the sense pin to V- to indicate a second configuration. In another embodiment of the invention, shown in FIG. 1C, the connector 112 comprises contacts 160A and 160B, which, when shorted together, may indicate a first configuration and when not electrically shorted may indicate a second configuration. Accordingly, the connector 120 may comprise a knock-out 162 which may electrically short the contacts 160A and 160B when present and may leave the contacts 160A and 160B open circuited when absent. Accordingly, the connector 120A may indicate that it configured one way and the connector 120B may indicate that it is configured another way.

In various embodiments of the invention, the indication may comprise transient signals generated by components integrated into the connector 112 and/or the connector 120. For example, upon mating of the connectors, the data may be read out from the NVM 150 and communicated to the device 102*a* and/or to the device (not shown) coupled to the other end of the cable 133. As another example, upon mating the connectors, the module 156 and the PHY 116 may interact to send one or more messages in accordance with a management protocols. The management protocol message(s) may be sent to the device 102*a* and/or to the device on the other end of the cable 133.

Characteristics of the connection platform 134, may determine a mode of operation of the device 102*a*. For example, a data rate at which the device 102*a* communicates over the connection platform 134, which protocols are supported by the device 102a, whether the device 102a supplies or sinks power via the connection platform 134, and an amount of power supplied or sinked by the device 102a via the connection platform 134 may be determined based on characteristics of the connection platform 134.

Figure 2A:
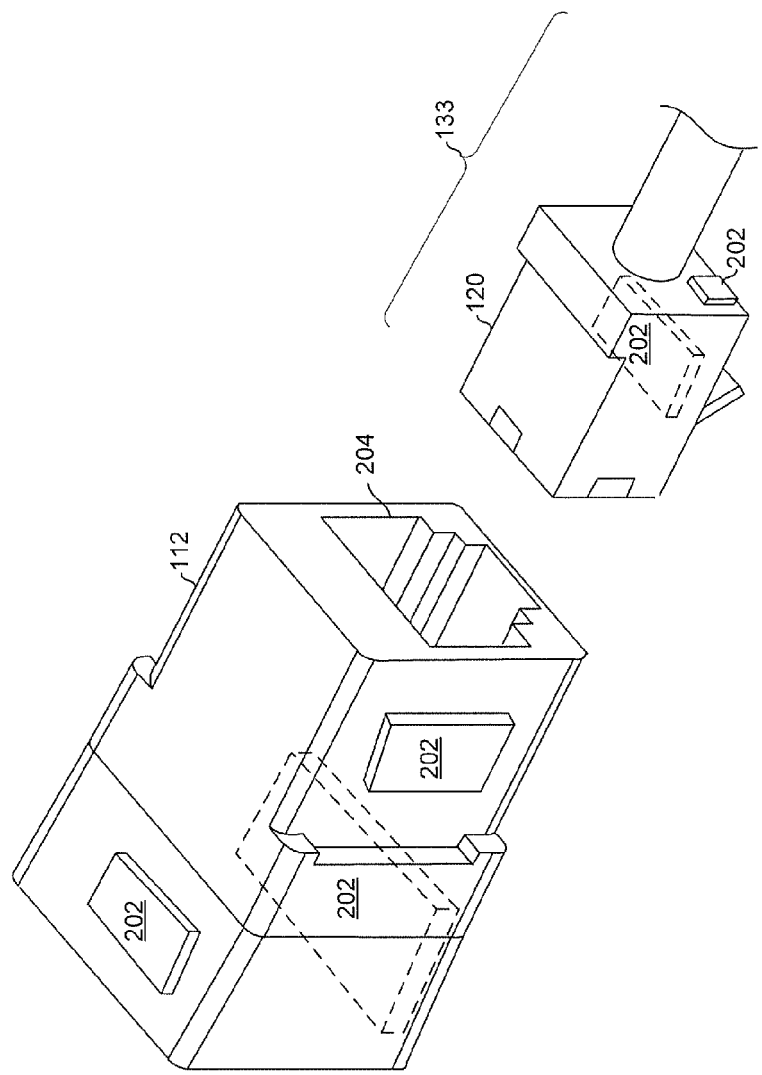
FIG. 2A is a three dimensional representation of exemplary embodiments of Ethernet connectors, in accordance with an embodiment of the invention.

FIG. 2A is a three dimensional representation of exemplary embodiments of Ethernet connectors, in accordance with an embodiment of the invention. Referring to FIG. 1, there is shown the connector 112, the connector 120, and a portion of the cable 133.

In the exemplary implementation of the connector 112 depicted in FIG. 2A, may comprise a modular housing that may be operable to be stacked, ganged and/or installed in a networking device a space-efficient and/or uniform manner. Materials utilized for housing of the Ethernet connectors 110 and/or 150 may vary. For example, the housing may be made of non-conducting and/or conducting materials such as plastic and/or metal. The Ethernet connectors 112 and/or 120 may be shielded or unshielded.

The Ethernet connector 112 may be a receptacle connector that may comprise a modular housing and the Ethernet connector 120 may be a corresponding Ethernet connector which may be referred to as a plug. The Ethernet connector 112 may comprise a keyed receptacle area 204 and the Ethernet connector 120 may comprise a complimentary exterior contour that may enable mating of the connectors in a proper orientation such that the connectors are not misaligned and/or damaged. The invention is not limited to any specific shape of the keyed receptacle area 204 and/or of the corresponding exterior contour of the Ethernet connector 120 and any suitable shapes may be utilized.

In various configurations of the connector 112 and/or the connector 120, various components 202 may be integrated within and/or on the connector 112 and/or the connector 120. The components 202 may comprise, for example, integrated circuits and/or passive components. In some instances, one or more of the components may comprise a printed circuit board to which one or more other components are soldered.

The Ethernet connector 112 may be configured to be coupled to a circuit board in a communication device, to be installed in a patch panel or a wall mount and/or to be coupled to a cable, for example. The Ethernet connector 112 and/or the Ethernet connector 120 may comprise dimensions that are smaller than a conventional Ethernet connector, such as an eight position eight conductor (8P8C) modular connector, often referred to as an RJ45 connector. In this regard, the Ethernet connector 112 and/or the Ethernet connector 150 may be small enough to be installed in a handheld device, such as a mobile phone or smart phone. In another exemplary embodiment of the invention, the Ethernet connector 112 and/or the Ethernet connector 120 may be small enough such that greater than 48 connectors or connector modules may be installed in a 1 rack unit (RU) patch panel or switch.

Figure 2B:
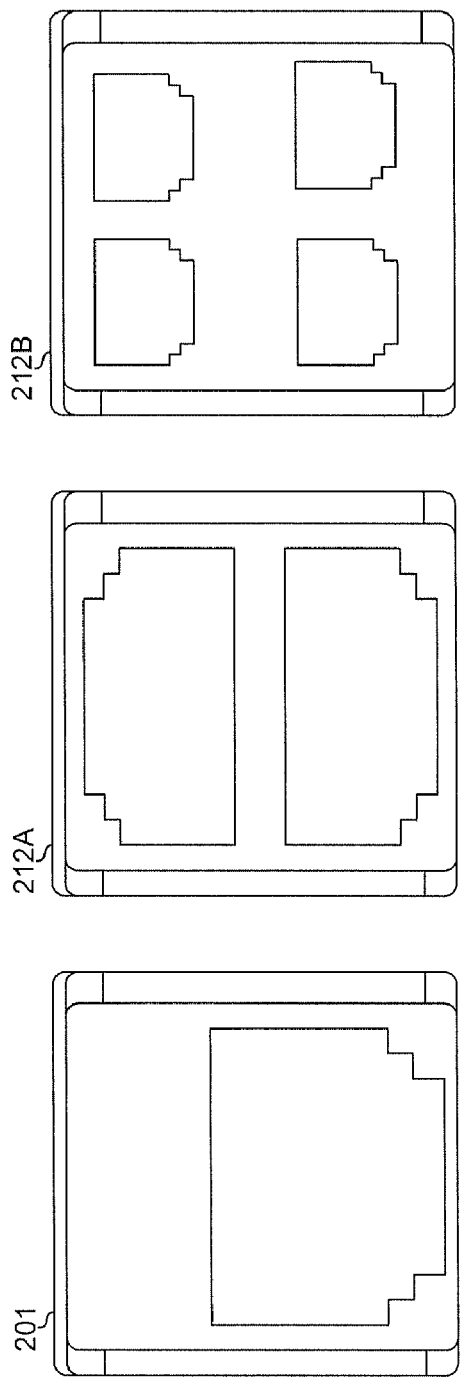
FIG. 2B is a block diagram illustrating exemplary embodiments of a configurable connector for Ethernet applications, in accordance with an embodiment of the invention.

In an exemplary embodiment of the invention a plurality of connectors 112 may fit in a housing which would fit only one conventional Ethernet connector. For example, referring to FIG. 2B, there is shown a conventional Ethernet connector 212 and two connectors 212A and 212B. The connector 212A may effectively comprise two instances of connector 112 described above, and the connector 212B may effectively comprise four instances of the connector 112. Furthermore, in an exemplary embodiment of the invention, the connector 220A and/or the connector 220B may have the same solder land pattern as an existing Ethernet connector. In this manner, the connector 120A and the connector 120B may be "dropped in" to an existing PCB designed to accept a conventional Ethernet connector. Moreover, in instances that MAC functions and a pair of Ethernet PHYs are integrated in the connector 120A, replacing the connector 201 with the connector 212A, along with some other minor retrofitting of the communication device, may enable replacing a single Ethernet port with multiple Ethernet ports. In other instances, one of the receptacles of the connector 212A may be only for charging and the other may be for Ethernet communications.

Referring back to FIG. 2A, various configurations of the Ethernet connectors 112 and/or 120 that may be operable to communicate at higher data rates and/or may provide higher levels of performance for a given rate, may be referred to as higher performance or higher end configurations. Similarly, various configurations of the Ethernet connectors 112 and/or 120 that may be operable to communicate only at lower data rates and/or may provide lower levels of performance for a given data rate, may be referred to as lower cost or lower end configurations. For example, higher end configurations of the Ethernet connectors 112 and/or 120, may comprise a greater number of conductor contacts, may be made with superior materials than lower end versions, may comprise shielding and/or better grounding, and/or may have one or more components 202, for providing additional functionality, integrated therein.

Although configurations of the Ethernet connectors 112 and/or 120 may vary, the various configurations may comprise the same or a similar general form factor. When a pair of corresponding Ethernet connectors 112 and 120 comprise the same or similar configurations, the Ethernet connectors may be operable to be coupled and may communicate at a data rate and/or at a level of performance that is determined based on their similar configurations. In instances when the coupled Ethernet connectors 112 and 120 may comprise different configurations, for example, when one connector may comprise a higher end configuration and the corresponding connector may comprise a lower end configuration, the Ethernet connectors may be operable to be coupled, however, they may only be operable to communicate at a data rate and/or at a level of performance that is supported by the lower end configuration. For example, the Ethernet connectors 112 and 120 may each have 12 positions for pins.

Figure 3:
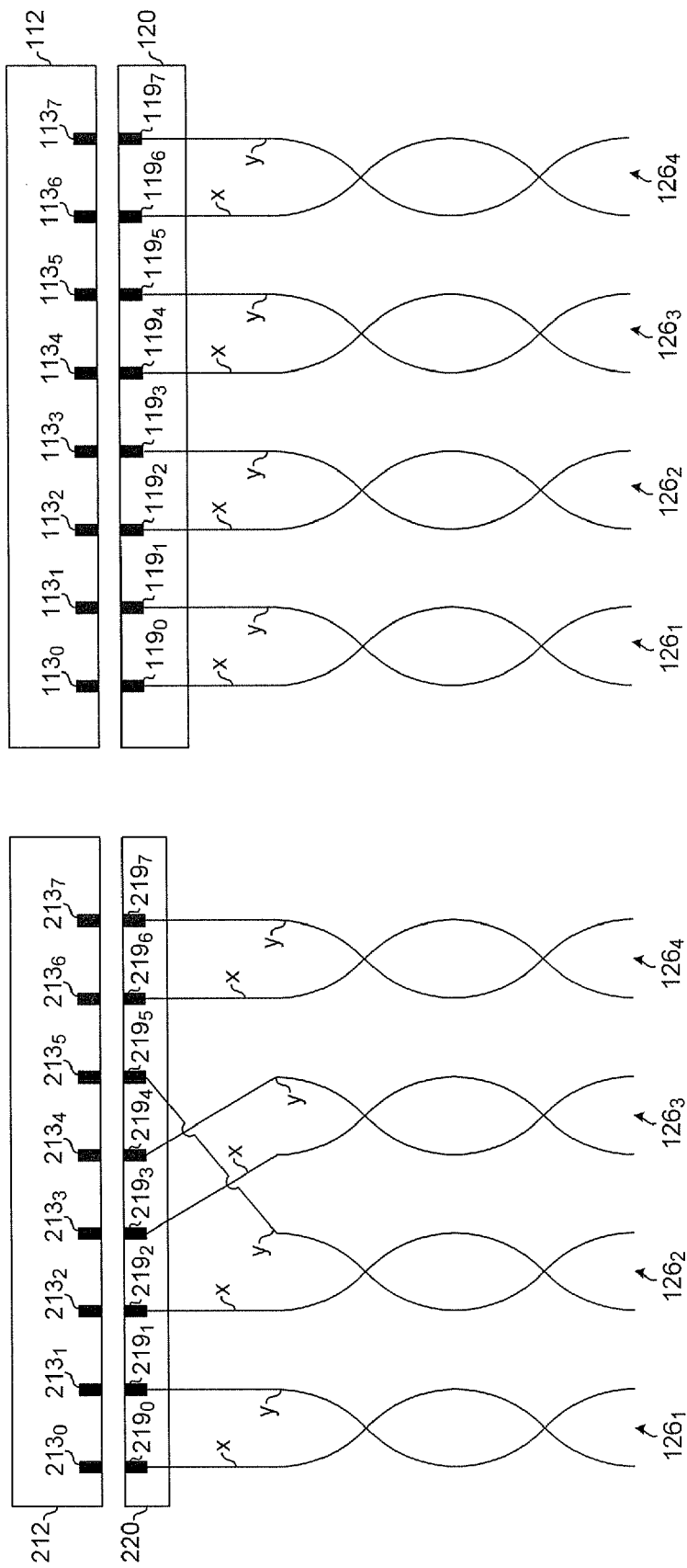
FIG. 3 is a diagram illustrating termination of twisted pairs in a configurable Ethernet connector, in accordance with an embodiment of the invention.

FIG. 3 is a diagram illustrating termination of twisted pairs in a configurable Ethernet connector, in accordance with an embodiment of the invention. Referring to FIG. 3, there is shown termination of four twisted pairs $126_1$-$126_4$ in a conventional Ethernet connector 220 and in an exemplary configuration of the connectors 120. Each of the twisted pairs $126_1$-$126_4$ may comprise a conductor x and a conductor y. In the connector 220, the x and y conductors of twisted pair $126_2$ a terminated in non-adjacent pins $219_2$ and $219_5$ which, when the connectors 212 and 220 are mated, make contact with the pins $213_2$ and $213_5$, respectively. Conversely, the x and y conductors of each of the twisted pairs $126_1$-$126_4$ are terminated in adjacent pins of the connector 120. Twisted pair $126_1$ is terminated in adjacent pins $119_0$ and $119_1$ which, when connectors 112 and 120 are mated, make contact with pins $113_0$ and $113_1$, respectively. Twisted pair $126_2$ is terminated in adjacent pins $119_2$ and $119_3$, which, when connectors 112 and 120 are mated, make contact with pins $113_2$ and $113_3$, respectively. Twisted pair $126_3$ is terminated in adjacent pins $119_4$ and $119_5$, which, when connectors 112 and 120 are mated, make contact with pins $113_4$ and $113_5$, respectively. Twisted pair $126_4$ is terminated in adjacent pins $119_6$ and $119_7$, which, when connectors 112 and 120 are mated, make contact with pins $113_6$ and $113_7$, respectively.

Figure 4A:
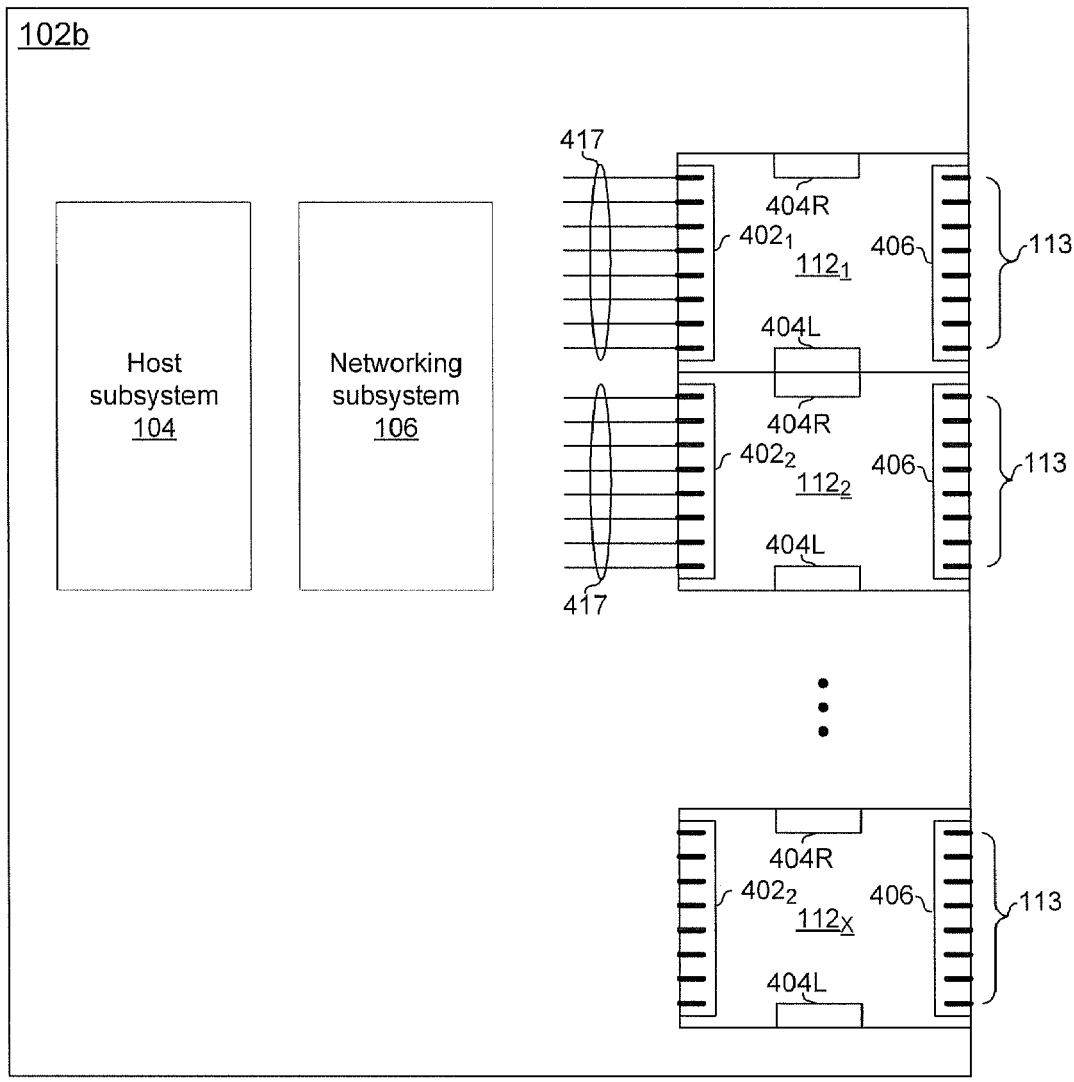
FIG. 4A depicts a block diagram illustrating ganging together of multiple connectors, in accordance with an embodiment of the invention.

FIG. 4A depicts a block diagram illustrating ganging together of multiple connectors, in accordance with an embodiment of the invention. Referring to FIG. 4, there is shown a networking device 102b comprising a plurality, X, of connectors 112, where X is an integer greater than 1. The networking device 102b may be substantially similar to the networking device 102a described above. Each of the connectors $112_1$-$112_x$, may comprise a first interface 402 for coupling, via a printed circuit board, with the other subsystems of the networking device 102b, interfaces 404L and 404R for coupling with other connectors 112, and an interface 406 for coupling with a corresponding connector 120. In this regard, the connectors 112 may be modular in that connectors 112 may be added or removed with little or no changes and/or reconfiguration of the networking subsystem 106 and/or host subsystem 104. For example, the connectors 112 may be "plug and play" upon addition of a connector 112, the connector may be enumerated with a unique address and controlled by the host subsystem 104 via the signals 105 and/or one of the connectors 112 may assume the role of master and may control the remaining connectors which may assume the role of slaves.

Each of the interfaces 402, 404, and 406 of a connector 112 may comprise one or more contacts which may comprise, for example, pins and/or solder bumps. In an exemplary embodiment of the invention, the connector $112_1$ may be coupled to a data bus 117, and maybe one or more voltage rails and/or control signals, via the interface 402 of the connector $112_1$. Also, the connector $112_1$ may be coupled to connector $112_2$ via the interface 404L of the connector $112_1$ and the interface 404R of the connector $112_2$. A connector $112_3$, if present, may be similarly coupled to the connector $112_2$, a connector $112_4$ to the connector $112_3$, and so forth, up to connector $112_X$. In this manner, the connectors $112_1$-$112_x$, may be coupled, or "ganged," together in a daisy-chain fashion.

One advantage of coupling connectors together in this way is that printed circuit board real-estate beneath or near the connectors may not be needed for traces that run to the connectors 112 and may thus be used for routing other traces. In combination with the integration of components into the connector(s) 112, such a configurable modular connector system may free up a large amount of printed circuit board real-estate near where the connectors 112 are mounted.

In various embodiments of the invention, various ones of the connectors $112_1$-$112_x$ may be of various configurations. For example, some may be high performance configurations and some may be low cost configurations. As another example, some may have integrated PoE and/or power management components and some may not. Similarly, some may be have integrated components for participating in management protocols and some may not.

Figure 4B:
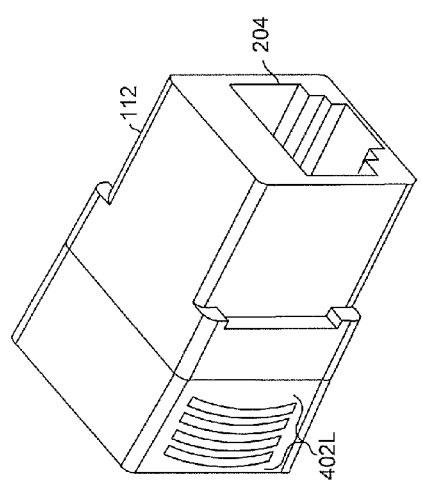
FIG. 4B is a three dimensional view of an Ethernet connector which may be ganged together with other connectors, in accordance with an embodiment of the invention.

FIG. 4B is a three dimensional view of an Ethernet connector which may be ganged together with other connectors, in accordance with an embodiment of the invention. The interface 402L of the connector 112 is shown in FIG. 4B. The size, shape, and number of contacts or pins of the interface 402L is not limited to that depicted in the figure.

Figure 4C:
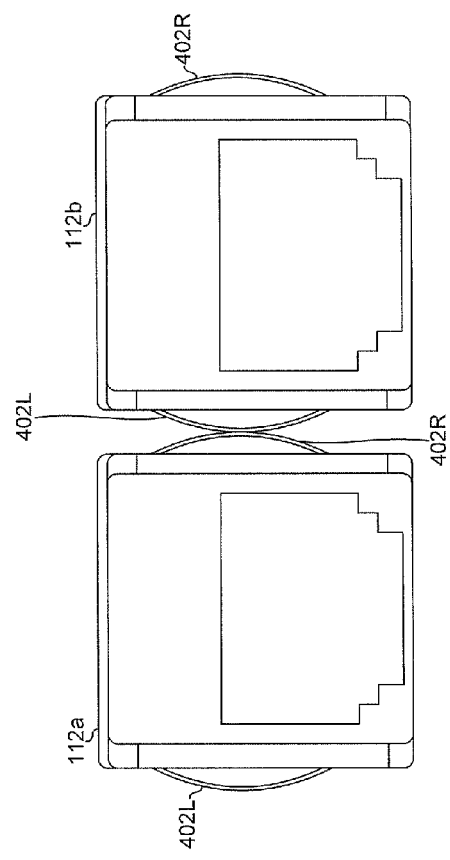
FIG. 4C is a diagram illustrating two ganged Ethernet connectors, in accordance with an embodiment of the invention.

FIG. 4C is a diagram illustrating two ganged Ethernet connectors, in accordance with an embodiment of the invention. Referring to FIG. 4C, it is shown how a first connector 112a may be coupled to a second connector via the interfaces 402R of the connector 112a and the interface 402L of the connector 112b. Although, FIG. 4C shows the connectors 112a and 112b with some distance between them in order to illustrate the contact of the interfaces, in various embodiments of the invention, the wall of connector 112a may sit flush with the wall of connector 112b.

Figure 5:
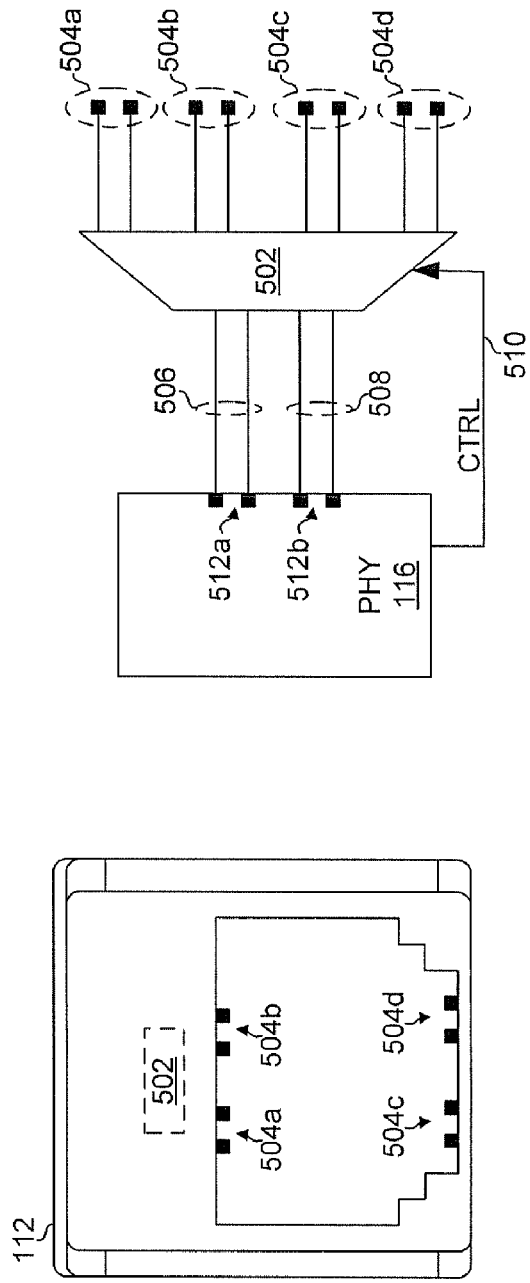
FIG. 5 is a diagram illustrating an example of an Ethernet connector with an integrated solid-state switch, in accordance with an embodiment of the invention.

FIG. 5 is a diagram illustrating an example of an Ethernet connector with an integrated solid-state switch, in accordance with an embodiment of the invention. Referring to FIG. 5, there is shown a front view of an exemplary Ethernet connector 112 comprising four pairs of pins 504a-504d and a solid-state switch 502 integrated within and/or on the Ethernet connector 112. Although, four pairs of pins 504 are shown, any number of pins may be present for interfacing to any number of twisted-pairs.

The solid-state switch 502 may comprise, for example, a discrete integrated circuit or may be integrated on a common substrate with other components, such as the Ethernet PHY 116. The Ethernet PHY 116 may be as described above and may comprise a plurality of ports 512. Although the PHY 116 is shown as comprising two ports, the Ethernet PHY may comprise any number of ports.

In operation, the PHY 116 may configure the switch 502 to configure which pin-pair 502 is coupled to which port 512. For example, in a first configuration of the switch 502, port 512a may be coupled to pin-pair 504a and port 512b may be coupled to port 512b, in a second configuration of the switch 502, port 512a may be coupled to pin-pair 504c and port 512b may be coupled to port 512d, and in a third configuration of the switch 502, port 512a may be coupled to pin-pair 504a and port 512b may be coupled to port 512d. The PHY 116 may determine which configuration to select based on, for example, characteristics of the cable coupled to the connector 112 and/or characteristics of a link partner coupled to the connector 112 via a cable. For simplex communications, the Ethernet PHY 116 may configure the switch 502 to match the configuration of a link partner. To illustrate, port 512a may be an ingress port and port 512c may be an egress port. Accordingly, the switch 502 may be configured such that port 512a is coupled to a twisted pair on which a link partner transmits and port 512b is coupled to a twisted pair on which the link partner receives.

Various aspects of a method and system for a configurable connector for Ethernet application may comprise an Ethernet connector 112 residing in an Ethernet enabled communication device 102a. The connector 112 may couple the communication device 102a to one or more twisted pairs 126 and enable communication of Ethernet frames over the one or more twisted pairs 126. Conductors x and y of each of the twisted pairs 126 may make contact with adjacent pins 113 of the configurable Ethernet connector 112. A size and shape of the configurable Ethernet connector 112 may enable housing more than 48 instances of the configurable Ethernet connector 112 in a single standard size one rack unit face plate of a 19-inch rack. The configurable Ethernet connector 112 may provide mechanical and electrical indications that enable the device 102a and/or a remote device coupled to the configurable Ethernet connector 112 to determine configuration information of the configurable Ethernet connector 112. The information may indicate presence or absence of various components within and/or on the configurable Ethernet connector 112. The components may comprise a memory device 150 which stores a configuration and/or capabilities of the configurable Ethernet connector 112. The components may comprise an Ethernet physical layer transceiver (PHY) 116. The components may comprise one or more circuits and/or processors 118 and/or 154 that are operable to manage supply power that may be sourced and/or sinked via the connector. The components may comprise a solid-state 502 switch that is configurable via one or more control signals 510, and a configuration of the solid-state switch 502 may determine which pins 113 of the Ethernet connector 112 are coupled to which pots) 512 of an Ethernet PHY 116. The one or more control signals 510 are generated by the Ethernet PHY 116.

The configuration information may indicate whether the Ethernet device 102a sources or sinks power. The configuration information may indicate which ones of the twisted pairs 126 are to be utilized for communicating the Ethernet frames. The configuration information may indicate which ones of the twisted pairs 126 are to be utilized for deliver of supply power. The configurable Ethernet connector 112 may comprise one or more first interfaces 406 that enable electrically coupling the connector to a cable assembly 133, one or more second interfaces 402 that enable electrically coupling the connector to a device that the connector is mounted within or on, and one or more third interfaces 404 that enable electrically coupling the configurable Ethernet connector 112 to a corresponding one or more other configurable Ethernet connectors 112 that are mounted on or within the device 102a. The configurable Ethernet connector 112 may support one or more of 10BASE-T, 100BASE-T, 1GBASE-T, 10GBASE-T, 40GBASE-T, and 100GBASE-T.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a configurable connector for Ethernet.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
in an Ethernet enabled communication device comprising a configurable Ethernet connector, communicating Ethernet frames via one or more twisted pairs communicatively coupled to said configurable Ethernet connector, wherein:
conductors of each of said one or more twisted pairs make contact with adjacent pins of said configurable Ethernet connector;
a size and shape of said configurable Ethernet connector enables housing of more than 48 instances of said configurable Ethernet connector in a single standard size one rack unit face plate of a 19-inch rack; and
said configurable Ethernet connector provides mechanical and electrical indications that enable a device coupled to said configurable Ethernet connector to determine configuration information of said configurable Ethernet connector.

2. The method according to claim 1, wherein said configuration information indicates presence or absence of various components within and/or on said configurable Ethernet connector.

3. The method according to claim 2, wherein said components comprise a memory device which stores a configuration and/or capabilities of said configurable Ethernet connector.

4. The method according to claim 2, wherein said components comprise an Ethernet physical layer transceiver (PHY).

5. The method according to claim 2, wherein said components comprise one or more circuits and/or processors that are operable to manage supply power sourced and/or sinked via said configurable Ethernet connector.

6. The method according to claim 2, wherein:
said components comprise a solid-state switch that is configurable via one or more control signals; and
a configuration of said solid-state switch determines which pins of said Ethernet connector are coupled to which ports of an Ethernet PHY.

7. The method according to claim 6, wherein said one or more control signals are generated by said Ethernet PHY.

8. The method according to claim 1, wherein said configuration information indicates whether said Ethernet device sources or sinks power.

9. The method according to claim 1, wherein said configuration information indicates which ones of said twisted pairs are to be utilized for communicating said Ethernet frames.

10. The method according to claim 1, wherein said configuration information indicates which ones of said twisted pairs are to be utilized for deliver of supply power.

11. The method according to claim 1, wherein said configurable Ethernet connector comprises:
one or more first interfaces that enable electrically coupling said configurable Ethernet connector to a cable assembly;
one or more second interfaces that enable electrically coupling said connector to a device that said configurable Ethernet connector is mounted within or on; and
one or more third interfaces that enable electrically coupling said connector to a corresponding one or more other configurable Ethernet connectors that are mounted on or within said device.

12. The method according to claim 1, wherein said configurable Ethernet connector supports one or more of 10BASE-T, 100BASE-T, 1GBASE-T, 10GBASE-T, 40GBASE-T, and 100GBASE-T.

13. A system for networking, the system comprising:
a configurable Ethernet connector residing in a Ethernet enabled communication device, wherein:
said communication device is operable to communicate Ethernet frames via one or more twisted pairs communicatively coupled to said configurable Ethernet connector;

conductors of each of said one or more twisted pairs make contact with adjacent pins of said configurable Ethernet connector;

a size and shape of said configurable Ethernet connector enables housing of more than 48 instances of said configurable Ethernet connector in a standard-size one-rack-unit face-plate of a 19-inch rack; and said configurable Ethernet connector provides mechanical and electrical indications that enable a device coupled to said configurable Ethernet connector to determine configuration information of said configurable Ethernet connector.

14. The system according to claim 13, wherein said configuration information indicates presence or absence of various components within and/or on said configurable Ethernet connector.

15. The system according to claim 14, wherein said components comprise a memory device which stores a configuration and/or capabilities of said configurable Ethernet connector.

16. The system according to claim 14, wherein said components comprise an Ethernet physical layer transceiver (PHY).

17. The system according to claim 14, wherein said components comprise one or more circuits and/or processors that are operable to manage supply power sourced and/or sinked via said configurable Ethernet connector.

18. The system according to claim 14, wherein:
said components comprise a solid-state switch that is configurable via one or more control signals; and
a configuration of said solid-state switch determines which pins of said Ethernet connector are coupled to which terminals of an Ethernet PHY.

19. The system according to claim 18, wherein said one or more control signals are generated by said Ethernet PHY.

20. The system according to claim 13, wherein said configuration information indicates whether said Ethernet device sources or sinks power.

21. The system according to claim 13, wherein said configuration information indicates which ones of said twisted pairs are to be utilized for communicating said Ethernet frames.

22. The system according to claim 13, wherein said configuration information indicates which ones of said twisted pairs are to be utilized for deliver of supply power.

23. The system according to claim 13, wherein said configurable Ethernet connector comprises:
one or more first interfaces that enable electrically coupling said configurable Ethernet connector to a cable assembly;
one or more second interfaces that enable electrically coupling said connector to a device that said configurable Ethernet connector is mounted within or on; and
one or more third interfaces that enable electrically coupling said connector to a corresponding one or more other configurable Ethernet connectors that are mounted on or within said device.

24. The system according to claim 13, wherein said configurable Ethernet connector supports one or more of 10BASE-T, 100BASE-T, 1GBASE-T, 10GBASE-T, 40GBASE-T, and 100GBASE-T.

* * * * *

UNITED STATES PATENT AND TRADEMARK OFFICE
CERTIFICATE OF CORRECTION

PATENT NO. : 8,145,814 B2  
APPLICATION NO. : 12/853945  
DATED : March 27, 2012  
INVENTOR(S) : Diab et al.

Page 1 of 1

It is certified that error appears in the above-identified patent and that said Letters Patent is hereby corrected as shown below:

Title Page
Item (54), please replace "Connnector" with --Connector--.

Column 14
Line 44, Claim 10, please replace "deliver" with --delivery--.

Column 14
Line 62, Claim 13, please replace "a Ethernet" with --an Ethernet--.

Column 16
Line 12, Claim 22, please replace "deliver" with --delivery--.

Signed and Sealed this
Twenty-fifth Day of December, 2012

David J. Kappos
*Director of the United States Patent and Trademark Office*

UNITED STATES PATENT AND TRADEMARK OFFICE
CERTIFICATE OF CORRECTION

PATENT NO.        : 8,145,814 B2
APPLICATION NO.   : 12/853945
DATED             : March 27, 2012
INVENTOR(S)       : Diab et al.

Page 1 of 1

It is certified that error appears in the above-identified patent and that said Letters Patent is hereby corrected as shown below:

Title Page, Item (54) and at Column 1, line 2, Title
Please replace "Connnector" with --Connector--.

Column 14
Line 44, Claim 10, please replace "deliver" with --delivery--.

Column 14
Line 62, Claim 13, please replace "a Ethernet" with --an Ethernet--.

Column 16
Line 12, Claim 22, please replace "deliver" with --delivery--.

This certificate supersedes the Certificate of Correction issued December 25, 2012.

Signed and Sealed this
Nineteenth Day of February, 2013

Teresa Stanek Rea
*Acting Director of the United States Patent and Trademark Office*